US010321697B2

(12) United States Patent
Gregg-Albers et al.

(10) Patent No.: US 10,321,697 B2
(45) Date of Patent: Jun. 18, 2019

(54) CONCENTRATE FOR MILKY BEVERAGES

(71) Applicant: Koninklijke Douwe Egberts B.V., Utrecht (NL)

(72) Inventors: Julia L. Gregg-Albers, Banbury (GB); Alan Wolfschoon-Pombo, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 14/655,325

(22) PCT Filed: May 6, 2015

(86) PCT No.: PCT/IB2015/000776
§ 371 (c)(1),
(2) Date: Jun. 24, 2015

(87) PCT Pub. No.: WO2015/170167
PCT Pub. Date: Nov. 12, 2015

(65) Prior Publication Data
US 2016/0255851 A1 Sep. 8, 2016

(30) Foreign Application Priority Data
May 9, 2014 (GB) .................................. 1408220.0

(51) Int. Cl.
*A23L 1/19* (2006.01)
*A23L 2/40* (2006.01)
(Continued)

(52) U.S. Cl.
CPC ............ *A23C 13/14* (2013.01); *A23C 9/1422* (2013.01); *A23C 9/15* (2013.01); *A23C 9/1516* (2013.01);
(Continued)

(58) Field of Classification Search
CPC ......... A23C 13/14; A23C 9/1422; A23C 9/15; A47J 31/407
(Continued)

(56) References Cited

U.S. PATENT DOCUMENTS 2,375,833 A * 5/1945 Urquhart ................. A01J 13/00
106/122
5,609,904 A 3/1997 Koh et al.
(Continued)

FOREIGN PATENT DOCUMENTS

CA 2674850 A1 3/2010
EP 0455288 A1 11/1991
(Continued)

OTHER PUBLICATIONS

Combined Search and Examination Report dated Nov. 12, 2014 for Application No. GB1408220.0 (8 pgs.).
(Continued)

*Primary Examiner* — Helen F Heggestad
(74) *Attorney, Agent, or Firm* — Fitch, Even, Tabin & Flannery LLP (57) ABSTRACT

The present invention relates to a liquid dairy concentrate for mixing with an aqueous medium to form a beverage, the concentrate comprising casein and at least 5 wt % fat, wherein a ratio of fat to casein is from 3:1 to 18:1.

18 Claims, 6 Drawing Sheets

(51) Int. Cl.

| | | |
|---|---|---|
| A23C 13/14 | (2006.01) | |
| A23C 9/142 | (2006.01) | |
| A23C 9/15 | (2006.01) | |
| A23L 2/385 | (2006.01) | |
| A23L 2/39 | (2006.01) | |
| A23L 2/66 | (2006.01) | |
| A23L 2/74 | (2006.01) | |
| A47J 31/40 | (2006.01) | |
| B65D 85/804 | (2006.01) | |
| A23F 5/40 | (2006.01) | |
| A23L 5/00 | (2016.01) | |
| A23P 30/40 | (2016.01) | |

(52) U.S. Cl.
CPC .............. *A23L 2/385* (2013.01); *A23L 2/39* (2013.01); *A23L 2/66* (2013.01); *A23L 2/74* (2013.01); *A47J 31/407* (2013.01); *B65D 85/8043* (2013.01); *A23F 5/40* (2013.01); *A23L 5/51* (2016.08); *A23P 30/40* (2016.08)

(58) Field of Classification Search
USPC ......... 426/72, 112, 491, 492, 580, 586, 590, 426/601
See application file for complete search history.

(56) References Cited

U.S. PATENT DOCUMENTS

| | | | |
|---|---|---|---|
| 2011/0086156 A1 | 4/2011 | Jaswal et al. | |
| 2014/0370156 A1* | 12/2014 | Criezis ................ | A23C 9/1516 426/74 |

FOREIGN PATENT DOCUMENTS

| | | | |
|---|---|---|---|
| EP | 0714609 | A2 | 6/1996 |
| EP | 0788744 | A1 | 8/1997 |
| EP | 1676786 | A2 | 7/2006 |
| ES | 2364468 | A1 | 9/2011 |
| GB | 1034124 | A | 6/1966 |
| GB | 1526862 | A | 10/1978 |
| JP | 2006-516907 | A | 7/2006 |
| RU | 2009146997 | A | 6/2011 |
| RU | 2474525 | C2 | 2/2013 |
| WO | 9834495 | | 8/1998 |
| WO | 2003090545 | A1 | 11/2003 |
| WO | 2004017743 | A1 | 3/2004 |
| WO | 2008026940 | A1 | 3/2008 |
| WO | 2010005297 | A1 | 1/2010 |
| WO | 2013008904 | A1 | 1/2013 |

OTHER PUBLICATIONS

Requisition by the Examiner, dated Nov. 3, 2015 for Canadian Application No. 2,895,306 (4 pgs.).
Examination Report for United Kingdom Application No. GB 1408220.0 dated Jan. 29, 2018 (5 pages).
Examination Report for Japanese Application No. 2016-567012 dated Aug. 29, 2017 (15 pages).
Cheeses and related cheese products: proposal to permit the use of ultrafiltered milk, Food and drug administration of he united states department health and human services[online], Jan. 12, 2006, p. 1-12, retrieval date: Aug. 15, 2017, retrieved from the Internet URL:http://www.fda.gov/ohrms/dockets/dockets/00p0586/00p-0586-c000090-02-tab-01-vol27.pdf (cited in Japanese examination report of Aug. 29, 2017) (11 pages).
Examination Report for Russian Application No. 2016144080 dated Dec. 12, 2017 (11 pages).

* cited by examiner

CONCENTRATE FOR MILKY BEVERAGES

CROSS REFERENCE TO RELATED APPLICATIONS

This application is a U.S. national phase application of International Application No. PCT/IB2015/000776, filed May 6, 2015, which claims benefit from Great Britain Application 1408220.0, filed May 9, 2014, which are hereby incorporated herein by their reference in their entirety.

FIELD

This disclosure relates to a method of producing a concentrated ingredient for providing milky beverages or the milky portion of a beverage, such as a Latte. In particular, the disclosure relates to a method for forming the ingredient from cream, which provides improved foaming on dissolution.

BACKGROUND

It is known to produce milk beverages from a milk concentrate and, indeed, the use of skimmed milk powders to whiten coffee beverages is commonplace. Such milk powders serve to provide a milk beverage on reconstitution with water and are often used in beverage preparation machines to provide a convenient source of milk for a consumer looking to reproduce café-style beverages at home. For example, it is known to provide beverage capsules containing a mixture of coffee powder and a milk powder which can be dissolved to provide a Latte beverage.

It is also known to provide a liquid dairy ingredient for use in such beverage preparation systems. For example, EP1676786 describes the use of a concentrated liquid milk ingredient which can be used to provide a milk beverage. In particular, it is an aim of EP1676786 to provide a foamed milk beverage and it was discovered that the use of a liquid ingredient encouraged foam production compared to a reconstituted powder ingredient.

GB1526862 relates to long life milk products with a reduced tendency to feather in coffee.

EP0788744 relates to a delactosed milk and milk powder and foodstuffs containing the same. The milk contains less than 2% lactose.

WO03090545 relates to a method of processing milk involving separating milk into a cream and a skim, separating the skim into a protein enriched retentate and a permeate, removing the permeate, separating the protein enriched retentate into a concentrate and an effluent, removing the effluent, and blending the cream and the concentrate to form a concentrated slurry having a standard ratio of protein to fat.

US2011/086156 relates to cream substitutes comprising: a cheese curd, a water source, and a combination of gums that provide the cream substitute the texture of a thick cream, and/or stability against oil separation.

ES2364468 relates to a concentrate prepared from milk, having a fat content of 10-20% by weight, a solids content of 30-45% by weight and a viscosity at 20° C. of 50-2000 cP.

EP0455288 relates to whippable non-dairy creams with low fat levels (15-25 wt %).

WO2008/026940 relates to a calcium depleted milk protein concentrates for stabilising foods.

WO2004017743 relates to a method for producing a food product from a concentrated protein.

WO9834495 relates to a higher density foamable instant coffee product.

WO2010005297 relates to a foaming composition.

SUMMARY

Accordingly, it is desirable to provide an improved liquid beverage concentrate and/or tackle at least some of the problems associated with the prior art or, at least, to provide a commercially useful alternative thereto.

In a first aspect the present disclosure provides a liquid dairy concentrate for mixing with an aqueous medium to form a beverage, the concentrate comprising casein and at least 5 wt % fat, wherein a ratio of fat to casein is from 3:1 to 18:1.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

A dairy ingredient is a food product produced from the milk of mammals, typically cows. Dairy ingredients typically take a number of forms including milk, cream, and butter. Milk products directly obtained tend to separate (or can be separated) into fractions depending on the relative fat content. In this way a cream layer may form on top of a milk and the relative fat contents will be at least 18 wt % for the cream and less than 5.5 wt % for the milk. Different fat levels can be achieved by concentrating and/or mixing milk and cream fractions.

A "liquid" dairy ingredient is an ingredient comprising sufficient water to be pumpable. A typical liquid dairy ingredient for the present process will have a solids content in the range of from 30 to 55 wt %. It will be appreciated that the liquid ingredient will be a suspension of milk-derived fats and proteins.

In the context of the product produced by the method described herein, a concentrate is a composition suitable for mixing with an aqueous medium to form a beverage. That is, the concentrate would preferably not be a ready to drink formulation and would instead be consumed with dilution. The ratio of dilution would preferably be in an amount of from 5:1 to 9:1. For example, a 25 g concentrate would preferably be diluted with between 125 g and 225 g of water to form a final beverage between 150 and 250 g.

The fats present in the concentrate are preferably dairy fats. That is, fats which are derived from milk, rather than supplemented or added fat components.

Casein is a milk protein and is well known along with whey protein in dairy ingredients. The levels of fat and protein which can be found in different dairy ingredients varies significantly by ingredient type and any processing that has been conducted. A cream ingredient will typically have a high fat content and a low protein content: for example, the protein content of a 40 wt % fat-content cream may be in the region of 2-3 wt %, of which 80 wt % may typically be casein protein. The protein content of a 0.03 wt % fat-content skimmed milk product, however, may be in the region of 8-10 wt %, of which 90 wt % may typically be casein protein. Accordingly, the inventors have found that they can increase the levels of casein in a cream by concentrating the cream and then introducing a skimmed milk concentrate.

Native micellular casein is casein provided in an aqueous form such that the casein has not been denatured and has formed micelles in solution. These are typically calcium micelles in view of the minerals present in milk. An ideal source of native micellular casein is concentrated milk, especially microfiltrated skimmed milk concentrates which are aqueous solutions and rich in casein.

Ultrafiltration is a well-known process in the art. Ultrafiltration (UF) is a variety of membrane filtration in which conditions, such as pressure or concentration gradients, lead to a separation through a semipermeable membrane. Suspended solids and solutes of high molecular weight are retained in the so-called retentate, while water and low molecular weight solutes pass through the membrane in the permeate. Ultrafiltration is not fundamentally different from microfiltration, nanofiltration or membrane gas separation, except in terms of the size of the molecules it retains.

Diafiltration is a well-known process in the art. Diafiltration is a dilution process that involves removal or separation of components (permeable molecules like salts, small proteins, solvents etc.,) of a solution based on their molecular size by using micro-molecule permeable filters in order to attain pure solution. In the treatment of the dairy ingredient, diafiltration is used to remove lactose from the dairy ingredient.

Homogenisation is a process used to ensure the homogeneity of two immiscible liquids. It is well known to homogenise dairy compositions to ensure that the fat content is evenly distributed in the aqueous portion of the composition. Homogenization breaks the fat into smaller sizes so it no longer separates, allowing the sale of non-separating milk at any fat specification. Homogenisation is preferably a two-step high pressure process, such as a first step at from 100 to 200 Bar (preferably about 140 Bar) and a second step at from 10 to 30 Bar (preferably about 20 Bar).

Pasteurisation or retorting is a well-known process in the art. It involves heating a food composition to a specific temperature for a predefined length of time and then immediately cooling it after it is removed from the heat. This process slows spoilage caused by microbial growth in the food. Unlike sterilisation, pasteurisation is not intended to kill all micro-organisms in the food. Instead, it aims to reduce the number of viable pathogens so they are unlikely to cause disease.

As will be appreciated, the size of a milk beverage produced from concentrated ingredients will depend on the extent to which the ingredients can be diluted without losing the desirable flavour. Accordingly, for capsules, such as those disclosed in EP1676786, which is incorporated herein by reference, it is necessary to tailor the size of the capsule to ensure that sufficient concentrate can be provided.

The present inventors have found that it would be desirable to provide a full sized milk beverage from a reduced amount of beverage concentrate. The inventors have now found that a milk-flavoured beverage can be provided by the dissolution of a cream-derived concentrate in a higher dilution than can be achieved with a milk-derived ingredient. However, the use of a more concentrated milk ingredient was found to be unduly process intensive and the product was found to lack the desired mouthfeel and the level of foam production was compromised.

Without wishing to be bound by theory, it is considered that the higher levels of total solids in the cream contribute to a creamy milk-like mouthfeel. However, the inventors found that the use of a cream-derived concentrate did not provide a sufficient level of foaming. Surprisingly, the inventors found that the foaming properties could be restored and, indeed, improved by the supplementation of the casein level in the concentrate. However, this could only be achieved for a narrow range of fat to casein ratios.

In particular, the inventors added native casein micelles as a liquid concentrate to a cream-based concentrate and found that at given total fat to casein ratios (F/C) this positively impacts the foaming characteristics of a beverage: particularly foam height which is critical for consumer satisfaction. The addition of casein positively impacts the foam height when F/C ratios are lower than 18 F/C, but has the greatest impact on foam height when F/C ratios are between 14 and 18.

Foam height was found to be elevated when F/C is between 3 and 18, especially between 14 and 18, whereas foam height is depressed when F/C ratios are between 18 and 26. Unexpectedly the highest foam height is obtained when the ratio of large to small fat globules are identical in the foam and the brewed liquid, which occurs between 14 and 18 F/C. Interestingly, the pH values of each F/C ratio described in this invention were not significantly different from one another, indicating that pH appears not to be the driver of the foam height.

Through analysis by confocal microscopy, it was found that at 16 F/C the system reaches an equilibrium of fat and protein allowing the volume fraction of fat to start coalescing while still having enough protein left in the matrix to aid in foam production. Without wishing to be bound by theory, when the fat in the system becomes too saturated with fat, relative to protein (i.e. greater than 18 F/C), the system behaves as expected and lipid readily adsorbs at the air-water interface limiting the adsorption of protein and thus depressing foam height. Conversely, when the protein saturates the matrix (i.e. less than 14 F/C), the protein adsorption at the air-water interface reaches a maximum value thereby plateauing at an elevated level (higher foam height).

Accordingly, the inventors have found that an optimum foam can be produced when preparing a beverage by dilution of a liquid dairy concentrate comprising casein and at least 5 wt % fat, wherein a ratio of fat to casein is from 3:1 to 18:1. Preferably the foam is provided by one of a number of different foaming techniques. For example, the diluted beverage can be made to impact in a jet against a surface whereby air is incorporated into the beverage. The surface may be roughened and/or have impact surfaces to encourage foaming. Alternatively, the beverage may be foamed with an eductor the beverage would be formed into a jet and passed by an air inlet, whereby a drop in pressure caused by the jet would incorporate air into the beverage. Other means for foaming are also known in the art, such as mechanical foaming devices including impellers, and compressed air mixing devices, such as aerosols.

Preferably the concentrate comprises from 5-30 wt % fat, preferably 17-25 wt % fat. It is most preferred that the concentrate comprises about 22 wt % fat. The fat preferably consists of dairy fats.

Preferably the ratio of the fat to casein is from 14:1 to 18:1, more preferably from 15:1 to 17:1 and most preferably about 16:1. These ratios have been found to provide the most foaming, as shown in the figures.

Preferably the concentrate further comprises one or more components selected from stabilisers, salt, sugar and vitamin/mineral supplements.

The liquid dairy concentrate may contain one or more stabiliser, such as gum arabic. The stabiliser is preferably provided in an amount of from 0.625 wt %-1.0 wt % of the concentrate.

The liquid dairy concentrate may contain salt. Salt is preferably provided in an amount of from 0.8 wt %-1.4 wt % of the concentrate. The liquid dairy concentrate may contain vitamin or mineral supplements. Vitamin or mineral supplements are preferably provided in an amount of from 1.25 wt %-2.5 wt % of the concentrate. The liquid dairy concentrate may contain up to 1 wt % of other flavourings.

The liquid dairy concentrate may contain sugar. The sugar is preferably provided in an amount of from 13.5 wt %-36 wt % of the concentrate, preferably about 25 wt %. The sugar is typically sucrose and/or lactose. This amount of sugar is added sugar.

Preferably the concentrate consists of the dairy ingredient, together with one or more components selected from flavourings, stabilisers, salt, sugar and vitamin/mineral supplements, and a source of casein.

According to a further aspect there is provided a method for producing a liquid dairy concentrate, the method comprising:
providing a dairy ingredient having at least 5 wt % fat,
mixing the dairy ingredient with a source of casein to provide a ratio of fat to casein of from 3:1 to 18:1.

Preferably the method is for providing the concentrate described above. Accordingly, all aspects disclosed in relation to the first aspect may be applied equally to this aspect and vice versa.

Preferably the dairy ingredient is provided by concentrating cream, preferably by ultrafiltration and/or diafiltration. Preferably the dairy ingredient has a fat content of from 10 to 50 wt % fat, more preferably from 30 to 50 wt % fat, and most preferably from 45 to 50 wt % fat. The high levels of fat allow for an efficient process and a high concentration of the final concentrate once the further ingredients necessary to form the beverage concentrate have been included.

Preferably the casein is provided as native micellular casein. In particular, the casein is preferably provided as a concentrated milk ingredient. The casein is preferably provided in liquid form to ensure that the casein is provided as native micelles. Accordingly, the casein is preferably provided as a concentrated liquid dairy protein source, such as a microfiltrated skimmed milk. The concentrated liquid dairy protein source is preferably provided in an amount 8-22 wt %, more preferably from 12 to 18 wt % of the concentrate. Advantageously the protein source comprises a higher level of heat stable casein compared to whey protein in order to prevent whey protein gelation in downstream sterilization treatment of the final beverage system. The level of casein present in the concentrate will preferably be from 1 to 4 wt %, more preferably from 2 to 3 wt %.

Preferably the step of mixing comprises a high pressure homogenisation step.

Preferably the method further comprises filling the liquid dairy concentrate into a beverage capsule and/or pasteurising the liquid dairy concentrate. The capsule may be provided with a further packaging as desired.

According to a further aspect there is provided a liquid dairy concentrate obtainable by the method disclosed herein.

According to a further aspect there is provided a beverage capsule containing the liquid dairy concentrate as described herein and, optionally, means for foaming. Beverage capsules are well known in the art and any design suitable for holding a liquid ingredient may be employed. Preferably the means for foaming is an eductor.

According to a further aspect there is provided a method of preparing a beverage, the method comprising introducing an aqueous medium into the capsule described herein to produce a beverage by dilution of the liquid dairy concentrate, and dispensing the beverage from the capsule.

According to a further aspect there is provided a system for preparing a beverage, the system comprising a capsule as described herein and a beverage preparation machine for providing a flow of aqueous medium through the capsule to dispense a beverage.

BRIEF DESCRIPTION OF THE FIGURES

The invention will now be described in relation to the following non-limiting figures, in which.

Figure 5:
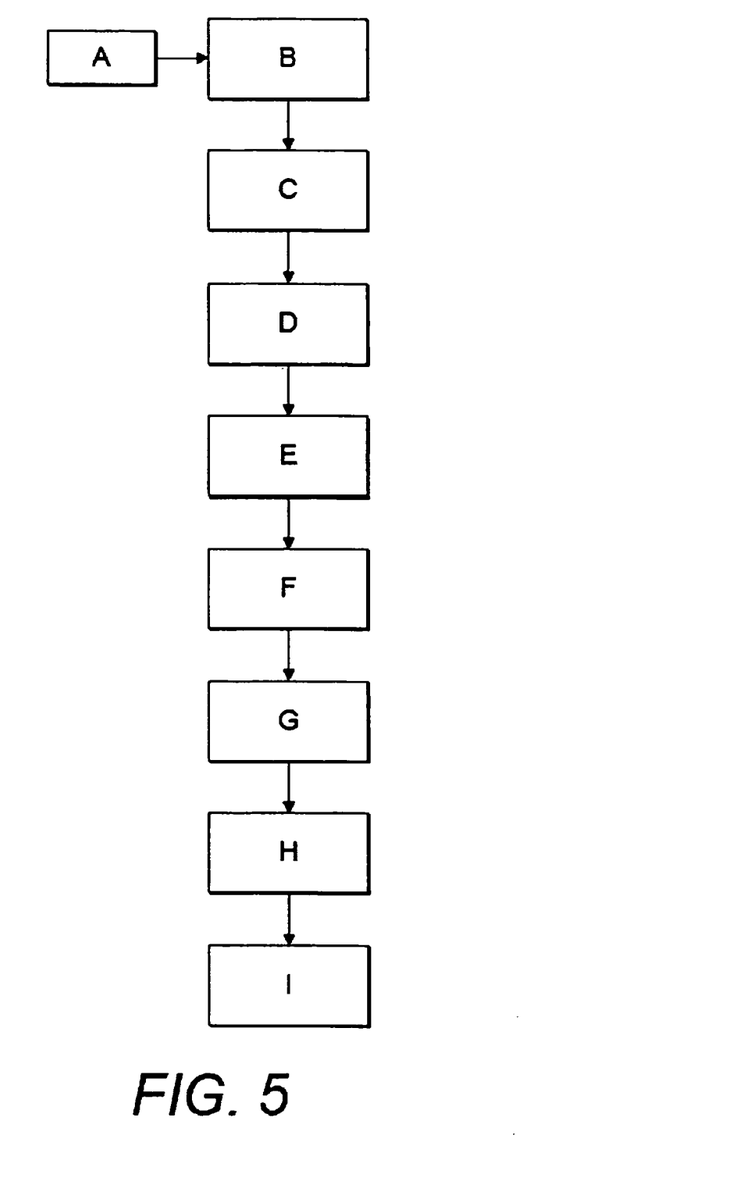
FIG. 5 shows a flowchart of a prior art method.

In FIG. 5, the flow chart boxes are as follows:
A—supply of milk
B—Ultrafiltration processing
C—Homogenisation (2 stage)
D—Cooling to less than 12° C.
E—Storage for less than 72 Hours at less than 8° C.
F—A mixing step for adding water, salt and stablisers (Etc.)
G—Storage for less than 12 Hours at less than 12° C.
H—Capsule filling
I—Pasteurisation at 124° C. for 13 minutes In FIG. 6, the flow chart boxes are as follows (like reference numerals have been used for clarity):
A'—supply of cream with about 40% fat
B'—Ultrafiltration and diafiltration processing, with the removal of lactose.

Figure 6:
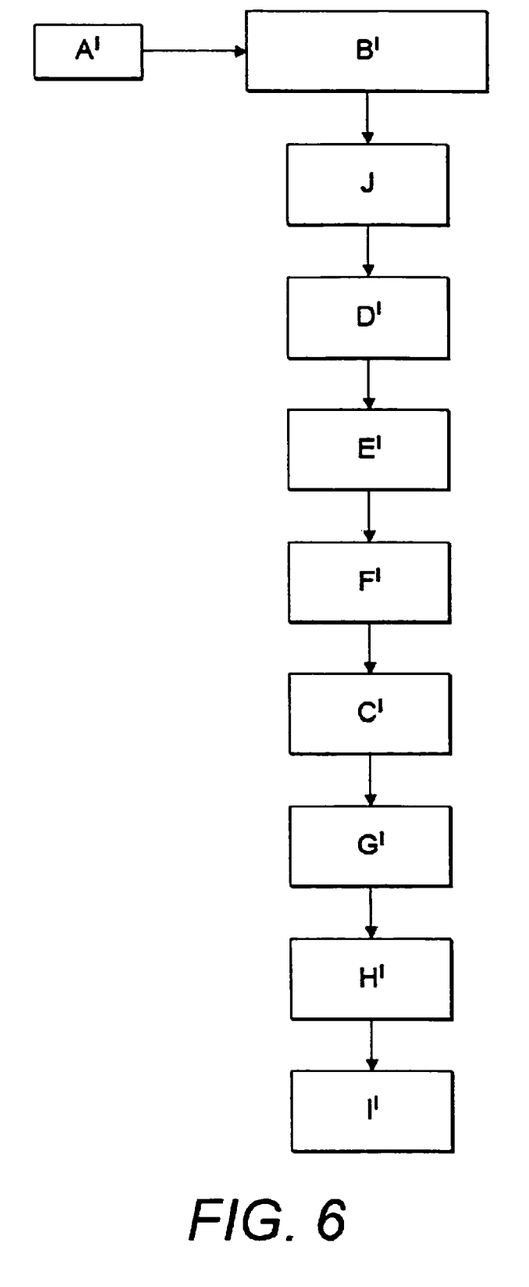
FIG. 6 shows a flowchart of a method for the production of a concentrate as discussed herein.

Step B' results in a concentrate having about 50% solids, 2-3% protein, 44%+ fat and less than 1% lactose.

After step B', sucrose is added in step J.
D'—Cooling to less than 12° C.
E'—Storage for less than 72 Hours at less than 8° C.
F'—A mixing step for adding water, salt and casein (Etc.)
C'—Homogenisation (2 stage)
G'—Storage for less than 12 Hours at less than 12° C.
H'—Capsule filling
I'—Pasteurisation at 124° C. for 13 minutes

DETAILED DESCRIPTION

The invention will now be described in relation to the following non-limiting examples.

According to a preferred example of the method, a liquid dairy concentrate is manufactured in the following steps:

Cream is provided and pasteurised, then cooled and buffered.

The cream is then heated above 50° C. and subjected to ultrafiltration and diafiltration.

Sugar is added to the concentrated cream to form a slurry.

The slurry is cooled to less than 8° C. for at least 30 minutes, then heated to above 70° C.

Liquid additions are made including an amount of water and microfiltrated milk concentrate.

Powder ingredients are then added including minerals.

The processed dairy liquid is then homogenised in a two step process at 200 and 20 Bar, then cooled below 8° C. for filling into beverage cartridges.

The filled and sealed beverage cartridges are then passed to a retort for pasteurisation.

The liquid additions include:
Liquid Micellular Casein Protein
Water

The powder ingredient additions include:
Sucrose
Dairy Minerals (Blend with higher Calcium)
Gum Arabic (Hydrocolloid)
Sodium Chloride
Natural Flavors (not in all formulations)
Trisodium Citrate The final product has a total solids of from 45 to 65 wt %, preferably 50-59 wt %; a fat content of 12 to 30 wt %, preferably 15-25 wt %; and a protein content of from 1 to 5 wt %, preferably 1.5-4%.

The salt is present in an amount of from 0.5 to 2 wt %, preferably 1 to 1.5 wt %; the sugar from 7 to 15 wt %, preferably 9 to 13 wt %; the added minerals in an amount of from 1 to 3 wt %, preferably 1.5 to 2.5 wt % (resulting in a calcium level in the finished product of 0.35 to 0.55 wt %); trisodium citrate in an amount of from 0.1 to 0.5 wt %, preferably 0.2 to 0.4 wt %; and gum arabic in an amount of from 0.25 to 1.5 wt %, preferably 0.5 to 1 wt %.

The casein enriched skimmed milk contrated (MF) is added in an amount of from 5 to 25 wt %, preferably 10 to 20 wt %.

Lactose in the final product (which is reduced from the levels in the cream due to the ultra- and diafiltration steps) are typically from 0.5 to 1.5 wt %, preferably 0.8 to 1.1 wt %.

All of the above ingredient ranges are contemplated individually as well as in combinations with the other listed ingredients. All percentages are by weight unless otherwise specified.

EXAMPLES

An exemplary method for producing a liquid dairy concentrate as described herein will now be provided.

A cream silo was provided containing cream having 38-43% fat and 40-47% total solids. This was subjected to an ultrafiltration process with diafiltration using spiral wound membranes. This was used to arrive at a concentrate having 49-51 wt % solids (a concentration factor of 1.2×) which was fed into a balance mixing tank.

Further ingredients such as sugar, salt, and a calcium dietary supplement were introduced into the concentrate, together with a skimmed milk casein-rich liquid additive.

The mixture was passed to a two stage homogeniser and homogenised in the first stage at 142 Bar and at 20 Bar in a second stage. The homogenised mixture was filed into a beverage cartridge and homogenised at a temperature of 124° C. for 11-15 minutes.

The precise order and steps for adding the further ingredients, as well as the temperature for conducting the steps can be adjusted as necessary to provide the final concentrate.

The following table includes an example of a recipe for a liquid dairy concentrate as described herein:

| Example 1 | |
|---|---|
| Ingredient | Amount (wt %) |
| Water | 3.5-5.5 |
| Cream concentrate | 56.5-58.5 |
| Sodium Chloride | 0.8-1.2 |
| Sugar, Fine | 24-26 |
| DAIRY MINERALS | 1.25-1.75 |
| STABILISER | 0.625-0.675 |
| Trisodium Citrate Dihydrate | 0.2-0.24 |
| Casein Enriched Skim Milk concentrate | 9.5-10.5 |

This example formulation has a total solids of from 57.5-59.5 wt %, a fat content of 26-28 wt % and a protein content of 2-2.4 wt % (of which about 90 wt % was casein).

Figure 1:
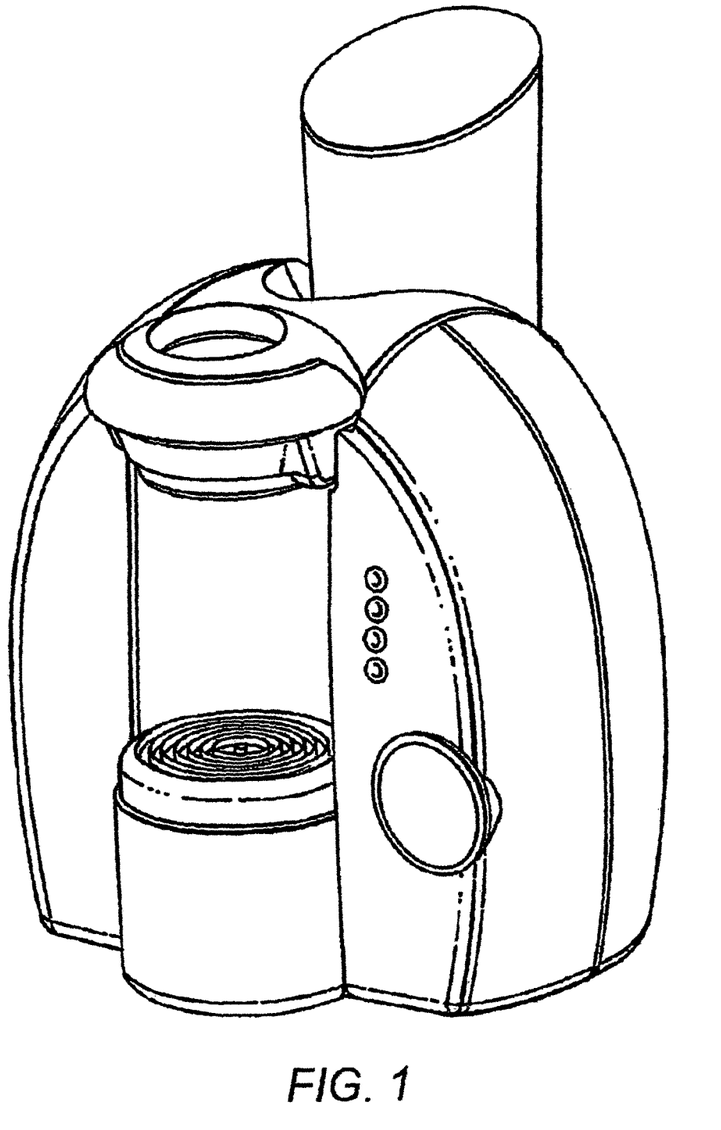
FIG. 1 shows a coffee beverage preparation system (1).
Figure 2:
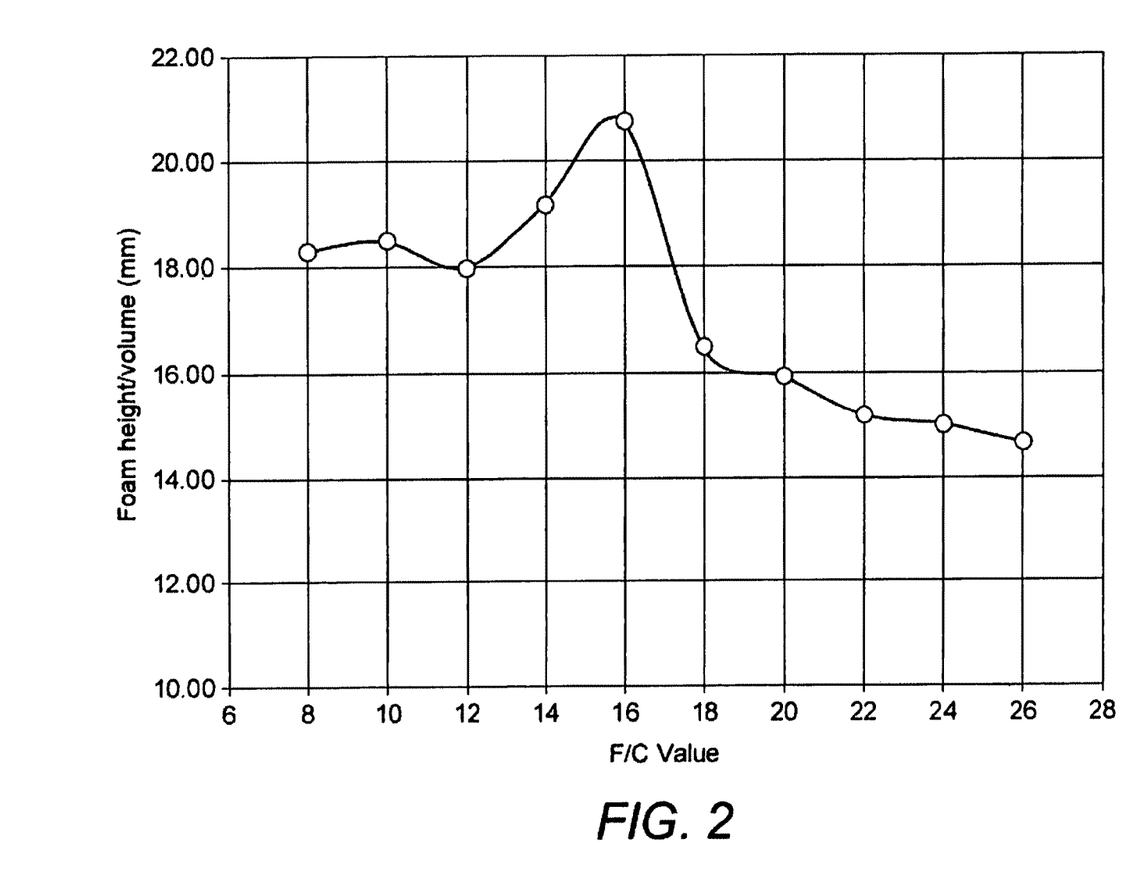
FIG. 2 shows a plot of foam height vs. F/C values in the range of from 8:1 to 26:1. The y-axis is foam height/volume measured in mm. The x-axis is the F/C value discussed herein.
Figure 3:
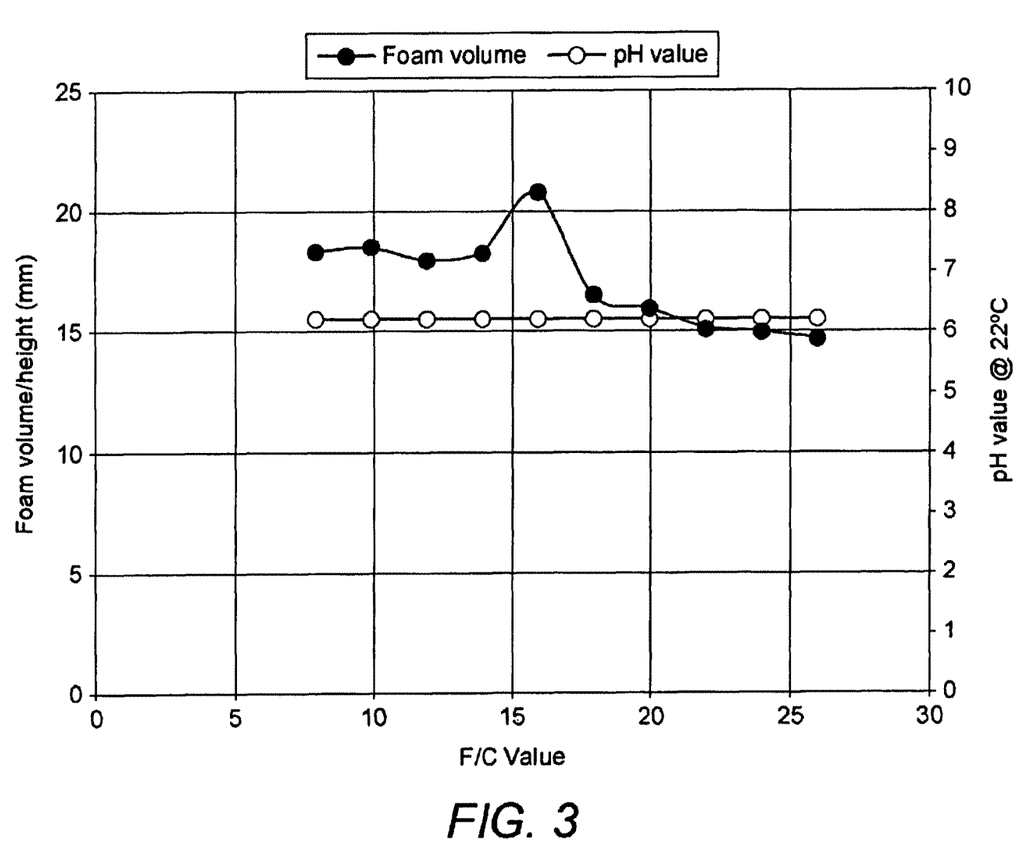
FIG. 3 shows a plot of foam height vs. F/C values in the range of from 8:1 to 26:1 and an overlaid plot of pH values vs. F/C values in the range of from 8:1 to 26:1. The lefthand y-axis is foam height/volume measured in mm, and relates to the line which peaks at 16 (F/C). The righthand y-axis is pH values measured at 22° C., and relates to to the substantially flat line with a value of about 6.2. The x-axis is the F/C value discussed herein.
Figure 4:
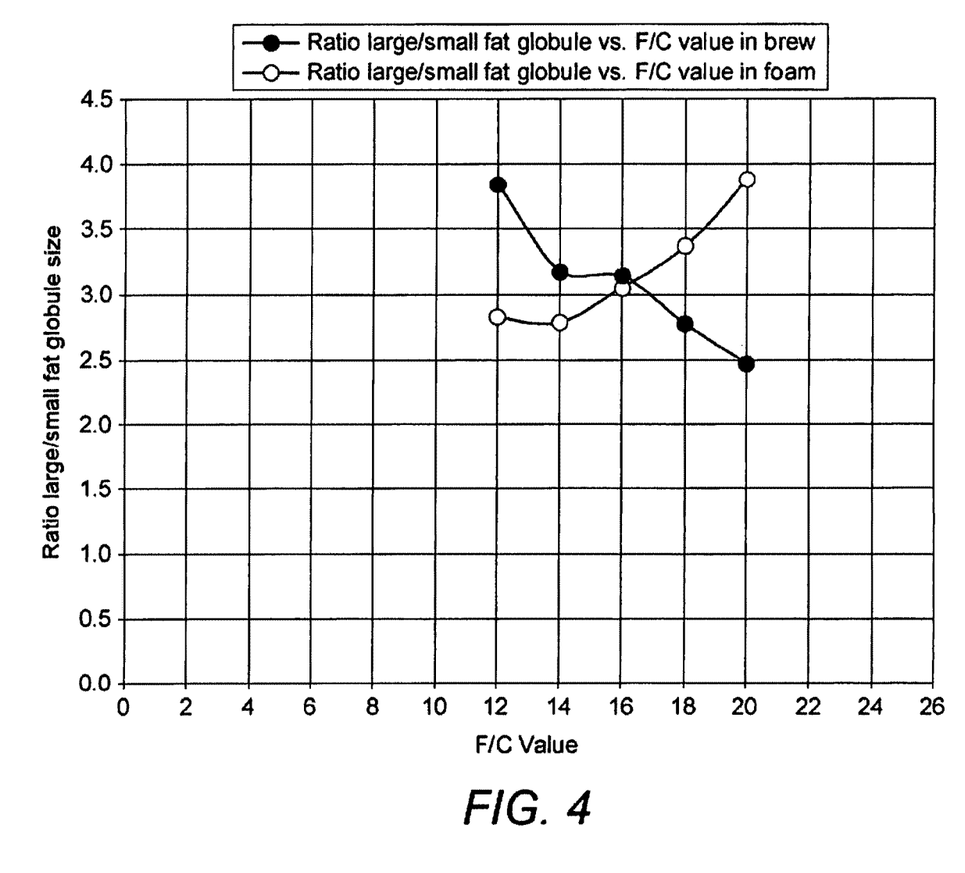
FIG. 4 shows a plot of the ratio of large to small fat globules (cut off 6 microns) vs. F/C values in the range of from 8:1 to 26:1. There are two lines plotted: the line for the brewed drink is highest for a value of F/C of 12 and lowest at a value of 20. The line for the Foam shows the opposite trend.

Further examples were prepared to demonstrate the effect of the fat/casein ratio on foam production and the results are reproduced in FIG. 2. Each of the formulations contained 0.8 wt % gum arabic as a stabiliser, 2 wt % of a mineral blend, 25 wt % sucrose and 1 wt % salt.

The concentrated cream base material produced by ultrafiltration of cream contained 2.14 wt % protein, of which 80 wt % was casein. This was supplemented with a microfiltrated skimmed milk having a total protein content of 8.8 wt %, of which 90 wt % was casein.

| Sample (fat/casein ratio) | MF Skim Milk Concentrate (wt %) | UF Cream 50% Total Solids (wt %) | Total Protein (wt %) | Total Fat (wt %) | Total Casein (wt %) | Fat:Casein (F/C) |
|---|---|---|---|---|---|---|
| 4 F/C | 37.5 | 30.18 | 3.97 | 14 | 3.48 | 4.01 |
| 6 F/C | 26 | 34.564 | 3.055 | 16 | 2.65 | 6.03 |
| 8 F/C | 18.5 | 47.601 | 2.904 | 22 | 2.28 | 9.64 |
| 10 F/C | 17.4 | 47.681 | 2.301 | 22 | 2.19 | 10.02 |
| 12 F/C | 12.8 | 47.681 | 2.184 | 22 | 1.83 | 12.02 |
| 14 F/C | 9.5 | 47.638 | 1.938 | 22 | 1.56 | 14.03 |
| 16 F/C | 7 | 47.651 | 1.674 | 22 | 1.37 | 16.05 |
| 18 F/C | 5.1 | 47.659 | 1.507 | 22 | 1.21 | 18.03 |
| 20 F/C | 3.6 | 47.665 | 1.375 | 22 | 1.10 | 19.97 |
| 22 F/C | 2.3 | 47.671 | 1.261 | 22 | 0.99 | 22.03 |
| 24 F/C | 1.25 | 47.676 | 1.168 | 22 | 0.91 | 24.03 |
| 26 F/C | 0.35 | 47.679 | 1.09 | 22 | 0.84 | 26.06 |
| 27 F/C | 0 | 47.681 | 1.059 | 22 | 0.81 | 26.95 |

| Sample (F/C) | Foam Volume (mm) | pH Value | Viscosity |
|---|---|---|---|
| 8 | 18.33 | 6.2 | 2156 |
| 10 | 18.5 | 6.2 | 2248 |
| 12 | 18 | 6.2 | 2040 |
| 14 | 18.33 | 6.23 | 1828 |
| 16 | 20.75 | 6.22 | 1208 |
| 18 | 16.5 | 6.23 | 1160 |
| 20 | 15.92 | 6.24 | 1104 |
| 22 | 15.17 | 6.24 | 948 |
| 24 | 15 | 6.25 | 940 |
| 26 | 14.7 | 6.25 | 920 |
| 27 | 12.5 | 6.28 | 832 |

All beverages brewed on identical Tassimo® brewer with distilled water as aqueous phase. Each prototype was brewed into clear standard 250 ml beakers (having a 6.7 cm diameter) and foam height was measured immediately after brewing with a standard ruler in mm. This was replicated 12 times for each prototype and the average was taken.

Preferably the foaming level achieved for a 25 g sample is at least 16 mm.

Confocal Laser Scanning Microscopy was performed on the initial concentrate, the brewed beverage and the beverage foam.

It was found that in the concentrates having a higher total protein content, the fat phase is mostly arranged in small droplets, which themselves are arranged in large agglomerates. At lower protein content, fat starts to form droplets/globules of larger sizes as the protein content goes down.

In the brewed beverage, at high total protein content the fat is mostly arranged in small droplets, that to a large extent are in large agglomerates. Apart from this, there are also larger fat droplets (up to ~15 μm). As the protein content decreases, the proportion of larger fat droplets increases.

In the foam on the brewed beverage, at high total protein content, both agglomerates of fine droplets are found in the liquid phase, and larger fat droplets in the liquid and liquid/air interface. As the protein content decreases, the proportion of larger fat droplets increases, while that of the agglomerates decreases. Additionally, at lower protein content, large fat globules form.

Prior to taking samples from the raw product of the brew portion, stirring was performed, to try and minimize the buoyancy effect. The buoyancy effect can be a major factor in emulsion systems and can cause the sizes presented to be misleading.

| F/C | Comments on (1) concentrate; (2) brewed beverage; and (3) the foam. |
|---|---|
| 4 | (1) The fat is arranged in agglomerates (~25-30 μm) of small fat droplets (~1-3 μm). Additionally, protein particles can be distinguished (~5 μm).<br>(2) The brew contains the agglomerates that are present in the raw product, as well as larger fat droplets (~3-10 μm).<br>(3) The foam contains a higher proportion of fat droplets, that are situated on the air-liquid interface. The liquid contains also a-small proportion of the fat agglomerates that are found in the raw product (not at the air/liquid interface). |
| 6 | (1) The raw product contains the fat in small agglomerates (~5 μm) of droplets, as well as larger droplets (~2-10 μm). Additionally, protein particles can be distinguished (~5 μm).<br>(2) The brew contains the agglomerates that are present in the raw product, but there is also evidence that some agglomerates have broken up, since the small droplets are dispersed as well. Additionally there are larger fat droplets (~3-10 μm).<br>(3) In the foam the fat is arranged in larger droplets (~5-20 μm, both in the liquid as well as at the air/liquid interface), and smaller droplets that look as if they originate from the agglomerates found in the raw product. |
| 8 | (1) The raw product contains the fat in small agglomerates (~5-10 μm) of droplets, as well as larger droplets (~2-10 μm). Additionally, protein particles can be distinguished (~5-10 μm).<br>(2) The brew contains the agglomerates that are present in the raw product, but there is also evidence that some agglomerates have broken up, since the small droplets are dispersed as well. Additionally there are larger fat droplets (~5-20 μm).<br>(3) In the foam the fat is arranged in larger droplets (~5-20 μm, both in the liquid as well as at the air/liquid interface), agglomerates as present in the raw product, and smaller droplets that look as if they originate from the agglomerates found in the raw product. |
| 10 | (1) The raw product contains the fat in small agglomerates (~5-8 μm) of droplets, as well as larger droplets (~2-10 μm). Additionally, protein particles can be distinguished (~5-10 μm).<br>(2) The brew contains the agglomerates that are present in the raw product, but there is also evidence that some agglomerates have broken up, since the small droplets are dispersed as well. Additionally there are larger fat droplets (~5-20 μm).<br>(3) In the foam the fat is arranged in larger droplets (~5-20 μm, both in the liquid as well as at the air/liquid interface), agglomerates as present in the raw product, and smaller droplets that look as if they originate from the agglomerates found in the raw product. |
| 12 | (1) The raw product contains the fat in small agglomerates (~5-15 μm) of droplets, as well as larger droplets (~2-10 μm). Additionally, protein particles can be distinguished (~5-10 μm).<br>(2) The brew contains the agglomerates that are present in the raw product, but there is also evidence that some agglomerates have broken up, since the small droplets are dispersed as well. Additionally there are larger fat droplets (~5-20 μm).<br>(3) In the foam the fat is arranged in larger droplets (~5-10 μm) both in the liquid as well as at the air/liquid interface, mostly at the interface. Additionally, there are smaller droplets that look as if they originate from the agglomerates found in the raw product. |
| 14 | (1) In the raw product there are small fat droplets (~1-3 μm), as well as larger fat droplets (~15 μm). Additionally, protein particles can be distinguished (~5-10 μm).<br>(2) The brew contains the agglomerates that are present in the raw product, but there is also evidence that some agglomerates have broken up, since the small droplets are dispersed as well. Additionally there are larger fat droplets (~5-15 μm).<br>(3) In the foam the fat is arranged in larger droplets (~2-10 μm) both in the liquid as well as at the air/liquid interface, mostly at the interface. Additionally, there are smaller droplets that look as if they originate from the agglomerates found in the raw product. |

| F/C | Comments on (1) concentrate; (2) brewed beverage; and (3) the foam. |
|---|---|
| 16 | (1) In the raw product there are lots of small fat droplets (~1-3 µm), as well as larger fat globules (~5-20 µm) and fat droplets (~3-5 µm). Additionally, protein particles can be distinguished (~5 µm).<br>(2) The fat in the brew is arranged in large droplets (~5-15 µm), and agglomerates (up to ~5 µm) of small fat droplets (~1-3 µm).<br>(3) In the foam the fat is dispersed as droplets with sizes around ~1-15 µm, as well as large fat globules with sizes of around ~~25-55 µm. Additionally, a protein particle can be distinguished (~8 µm). |
| 18 | (1) In the raw product there are small fat droplets (~1-3 µm), as well as larger fat globules/droplets (~5-30 µm). Additionally, protein particles can be distinguished (~5-10 µm).<br>(2) In the brew the fat is dispersed as droplets with sizes ranging from ~1 µm to ~30 µm.<br>(3) In the foam the fat is arranged in droplets as well (~1-30 µm), but with a higher proportion of larger ones than seen in the brew. Additionally there is the occasional large fat globule/droplet (larger than ~50 µm). |
| 20 | (1) In the raw product there are small fat droplets (~1-3 µm), as well as larger fat globules/droplets (~5-30 µm). Additionally, protein particles can be distihguished (~5-10 µm).<br>(2) In the brew the fat is dispersed as droplets with sizes ranging from ~1 µm to ~20 µm.<br>(3) The foam contains fat droplets that are in the liquid phase as well as at the air/liquid interface, and have sizes of around ~2-20 µm. |
| 22 | (1) Fat is arranged in fine droplets (~1-2 µm) as well as larger globules (~5-30 µm). Additionally, protein particles can be distinguished (labelled red in image, ~5 µm).<br>(2) In the brew the fat is dispersed in droplets (~5-20 µm), and aggregates of droplets are visible.<br>(3) In the foam the fat is arranged in droplets as well (~2-25 µm), but with a higher proportion of larger ones than seen in the brew. Additionally there is the occasional large fat globule/droplet (larger than ~50 µm). |
| 24 | (1) The fat is arranged in fine droplets (~2 µm) that are mostly in large agglomerates. Larger fat droplets (~10-30 µm) exist and form globules.<br>(2) Additionally, protein particles can be distinguished (~5-10 µm). In the brew the fat is dispersed in droplets (~5-20 µm), and aggregates of droplets are visible.<br>(3) In the foam the fat is arranged in droplets as well (~2-25 µm). Additionally there is the occasional large fat globule/droplet (~30-45 µm). |
| 26 | (1) The fat is arranged in fine droplets (~2 µm), that are partly in agglomerates. Larger fat droplets (~10-30 µm) exist and form globules. Additionally, protein particles can be distinguished (~5-10 µm).<br>(2) In the brew the fat is dispersed in droplets (~2-15 µm), and aggregates of droplets are visible.<br>(3) In the foam the fat is arranged in droplets (~2-20 µm). It appears as the air/liquid interface is not all covered with fat droplets. |
| 27 | (1) The fat is arranged in fine droplets (~2 µm), that are partly in agglomerates. Larger fat droplets (~10-30 µm) exist and form globules. Additionally, protein particles can be distinguished (~5-10 µm).<br>(2) In the brew the fat is dispersed in droplets (~2-15 µm).<br>(3) In the foam the fat is arranged in droplets as well (~1-10 µm), but with smaller sizes than seen in the brew. Additionally there are large fat globules, situated mainly at the liquid/air interface. |

As demonstrated by these results the improved foaming may be achieved by manipulating the fat to casein ratio (F/C), ideally to achieve an equilibrium which allows the volume fraction of fat to start coalescing while still leaving enough protein in the matrix to aid in foam production. Additionally and unexpectedly the ratios of large to small fat globules are identical in the foam and brewed liquid at this point (16 F/C).

If the matrix is taken to fat saturation (i.e. greater than 18 F/C) the system behaves as expected and lipid readily adsorbs at the air-water interface limiting the adsorption of protein and thus depressing foam height. Conversely, when the protein saturates the matrix (i.e. less than 14 F/C), the protein adsorption at the air-water interface reaches a maximum value thereby plateauing at an elevated level (higher foam height).

Although preferred embodiments of the invention have been described herein in detail, it will be understood by those skilled in the art that variations may be made thereto without departing from the scope of the invention or of the appended claims.

The invention claimed is:

1. A liquid dairy concentrate for mixing with an aqueous medium to form a beverage, the concentrate comprising cream concentrated by ultrafiltration and/or diafiltration and casein, and having at least 5 wt % fat, wherein a ratio of fat to casein is about 16:1, such that when the concentrate is mixed with the aqueous medium, a foam is formed on a surface of the beverage, the foam having a height of at least 20 mm, wherein the foam and the beverage comprise large fat globules greater than 6 microns and small fat globules less than 6 microns, and both the foam and the beverage have ratios of large to small fat globules of 2.5:1 to 3.5:1.

2. The liquid dairy concentrate according to claim 1, wherein the concentrate comprises from 5-30 wt % fat.

3. The liquid dairy concentrate according to claim 1, wherein the fat consists of dairy fats.

4. The liquid dairy concentrate according to claim 1, further comprising one or more components selected from flavourings, stabilisers, salt, sugar and vitamin/mineral supplements.

5. A beverage capsule containing the liquid dairy concentrate of claim 1 and having an eductor.

6. A method of preparing a beverage, the method comprising introducing an aqueous medium into the capsule according to claim 5 to produce a beverage by dilution of the liquid dairy concentrate, and dispensing the beverage from the capsule.

7. A system for preparing a beverage, the system comprising a capsule according to claim 5 and a beverage preparation machine for providing a flow of aqueous medium through the capsule to dispense a beverage.

8. A beverage capsule containing the liquid dairy concentrate of claim 1.

9. The liquid dairy concentrate according to claim 1, wherein the foam and the beverage have substantially similar ratios of large to small fat globules.

10. A method for producing a liquid dairy concentrate, the method comprising:
    providing a dairy ingredient having at least 5 wt % fat, the dairy ingredient provided by concentrating cream by ultrafiltration and/or diafiltration; and
    mixing the dairy ingredient with a source of casein to provide a ratio of fat to casein of about 16:1,
    and such that when the concentrate is mixed with an aqueous medium to form a beverage, a foam is formed on a surface of the beverage, the foam having a height of at least 20 mm,
    wherein the foam and the beverage comprise large fat globules greater than 6 microns and small fat globules less than 6 microns, and both the foam and the beverage have ratios of large to small fat globules of 2.5:1 to 3.5:1.

11. The method according to claim 10, wherein the casein is provided as native micellular casein.

12. The method according to claim 10, wherein the casein is provided as a concentrated milk ingredient.

13. The method according to claim 10, wherein the step of mixing comprises a high pressure homogenisation step.

14. The method according to claim 10, wherein the method further comprises filling the liquid dairy concentrate into a beverage capsule and/or pasteurising the liquid dairy concentrate.

15. A liquid dairy concentrate obtainable by the method of claim 10.

16. The method according to claim 10, wherein the foam and the beverage have substantially similar ratios of large to small fat globules.

17. A liquid dairy concentrate for mixing with an aqueous medium to form a beverage, the concentrate comprising cream concentrated by ultrafiltration and/or diafiltration and casein, and having at least 5 wt % fat, wherein a ratio of fat to casein is from 14:1 to 16:1, such that when the concentrate is mixed the aqueous medium, a foam is formed on a surface of the beverage, the foam having a height of at least 18 mm,
    wherein the foam and the beverage comprise large fat globules greater than 6 microns and small fat globules less than 6 microns, and both the foam and the beverage have ratios of large to small fat globules of 2.5:1 to 3.5:1.

18. The liquid dairy concentrate according to claim 17, wherein the foam and the beverage have substantially similar ratios of large to small fat globules.

* * * * *